July 24, 1956 E. F. KLESSIG ET AL 2,755,624
POWER TRANSMISSION
Filed Nov. 13, 1952 3 Sheets-Sheet 1

*INVENTORS*
ERNST F. KLESSIG
GLENN M. JONES
BY
*Ralph L. Tweedale*
ATTORNEY

July 24, 1956  E. F. KLESSIG ET AL  2,755,624
POWER TRANSMISSION

Filed Nov. 13, 1952  3 Sheets-Sheet 2

INVENTORS
ERNST F. KLESSIG
GLENN M. JONES
BY
Ralph L. Tweedale
ATTORNEY

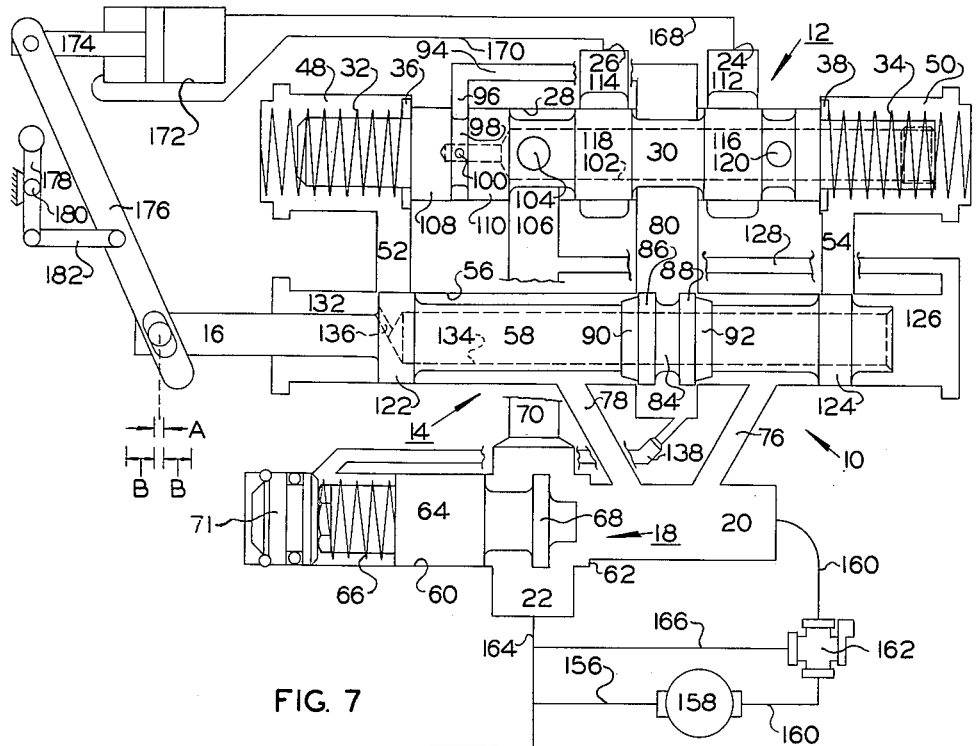
FIG. 7
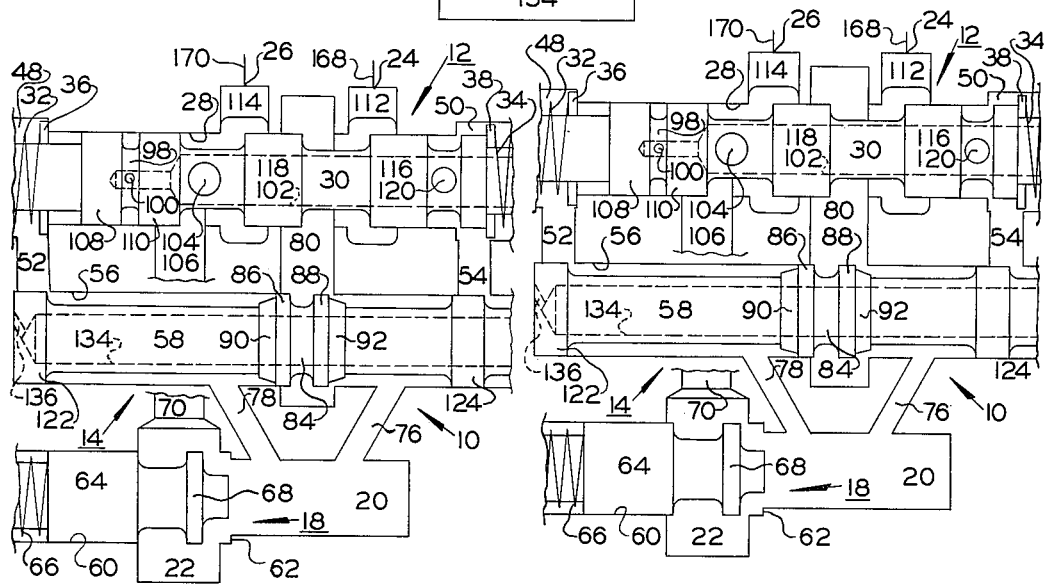
FIG. 8
FIG. 9
INVENTORS
ERNST F. KLESSIG
GLENN M. JONES
BY Ralph L. Tweedale
ATTORNEY

United States Patent Office 2,755,624
Patented July 24, 1956

2,755,624

POWER TRANSMISSION

Ernst F. Klessig, Berkley, and Glenn M. Jones, Farmington, Mich., assignors to Vickers Incorporated, Detroit, Mich., a corporation of Michigan Application November 13, 1952, Serial No. 320,288

14 Claims. (Cl. 60—52)

This invention relates to power transmissions and is particularly applicable to those of the type comprising two or more fluid pressure energy translating devices, one of which may function as a pump and another as a fluid motor.

The invention is more particularly concerned with such a system in which is incorporated a combined flow-metering, pump-unloading, motor-blocking, directional valve.

Hydraulic power transmission systems are usually either of the constant pressure or of the constant volume type. When the direction and speed of operation of the motor are to be controlled by a valve then the constant pressure system uses a closed center valve and the constant volume system uses either an open center valve or a closed center valve together with a separate pump-unloading valve. Heretofore in hydraulic power systems which are provided with any form of feed back from the motor to the control valve, as for example for the purpose of stopping the motor at a predetermined position or for providing follow-up servo motor action, it has been necessary to utilize either a constant pressure type system or to put up with certain deficiencies inherent in the constant volume system when utilized for this purpose. One such difficulty resides in the fact that a feed back from the motor does not move the conventional directional valve completely to its center position. Usually centering springs are provided to overcome this. Furthermore, if the motor is subject to a continuously applied load in one direction this failure to return the valve is aggravated and it becomes impossible to fully unload the pump. In other words, the pump goes on delivering its full volume to maintain in the motor a pressure sufficient to overcome the continuously applied load but all of this volume is delivered through the relief valve at a still higher pressure and thus wasted in the form of heat.

It is an object of the present invention to provide an improved power transmission system of the constant volume type incorporating a combined flow-metering, pump-unloading, motor-blocking, directional valve which may be controlled by feed back from the motor.

A further object is to provide such a system and valve therefor in which it is possible to fully block off all flow to and from the motor by centering the valve control stem.

Another object is to provide such a valve system in which the pump is fully unloaded when the valve control stem is centered.

It is a further object to provide such a valve system wherein good metering characteristics are provided so that the flow rate to the motor may be variably throttled by adjusting the position of the valve control stem.

A further object of the present invention is to provide power transmission of the type described which can be utilized with feed back without exhibiting any tendency to "hang up" with the motor at rest and the valve mechanism displaced from neutral position.

It is also an object to provide such a system and valve in which the metering action is pressure-compensated in the sense that the flow rate is maintained constant for a given setting of the control stem independently of the load resistance encountered at the motor.

Still another object is to provide a valve and system of this type wherein a single means performs the function of fully unloading the pump when the valve control stem is centered and performs the additional function of compensating for variations in motor load resistance at other positions of the valve stem when throttling action is desired.

These and other objects are accomplished by utilizing a valve structure having a spring centered, pilot operated, main directional valve together with a pilot valve for controlling the shifting of the former. The pilot valve is provided with means for metering, positioned in the main stream passage between the pump and motor. The main directional valve may thus be constructed so that it blocks communication with the fluid motor when the directional valve is centered. It may also be arranged to cause the pump to be unloaded. For this purpose there is preferably provided a separate unloading valve together with means on the directional valve for initiating unloading action when the directional valve is centered. In addition, the unloading valve may also serve as a pressure compensating valve by so connecting the former as to be responsive to the pressure drop across the metering passage of the pilot valve so as to maintain that pressure drop at a substantially constant value.

Further objects and advantages of the present invention will be apparent from the following description, reference being had to the accompanying drawings wherein a preferred form of the present invention is clearly shown.

In the drawings:

Figure 7 is a circuit diagram of a power transmission system incorporating the present invention and showing the valve mechanism in neutral position.

Figure 8 is a diagram corresponding to a portion of Figure 7 showing parts in position for minimum flow rate to the motor.

Figure 9 is a view corresponding to Figure 8 showing the position of the parts for a higher flow rate.

Figure 1:
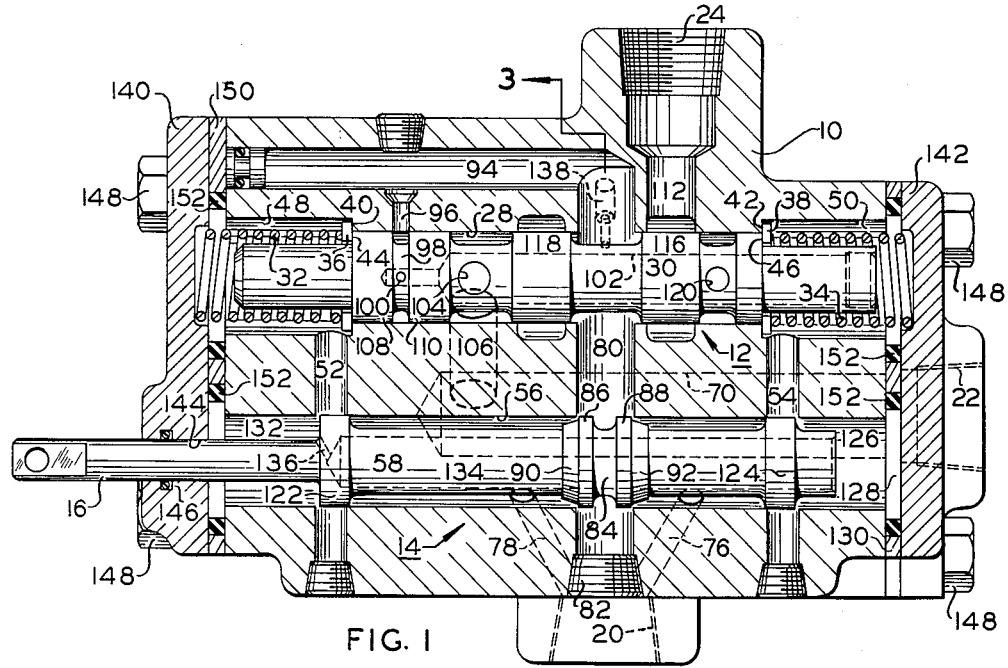
Figure 1 is a longitudinal sectional view on line 1—1 of Figure 2 of a valve assembly embodying a preferred form of the present invention.
Figure 3:
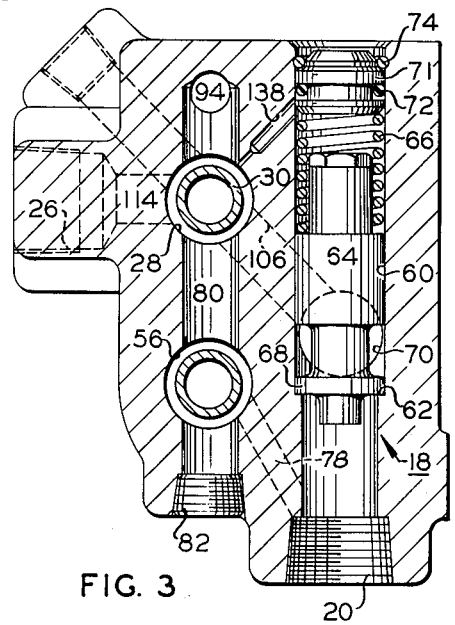
Figure 3 is a cross section on line 3—3 of Figure 1.
Figure 4:
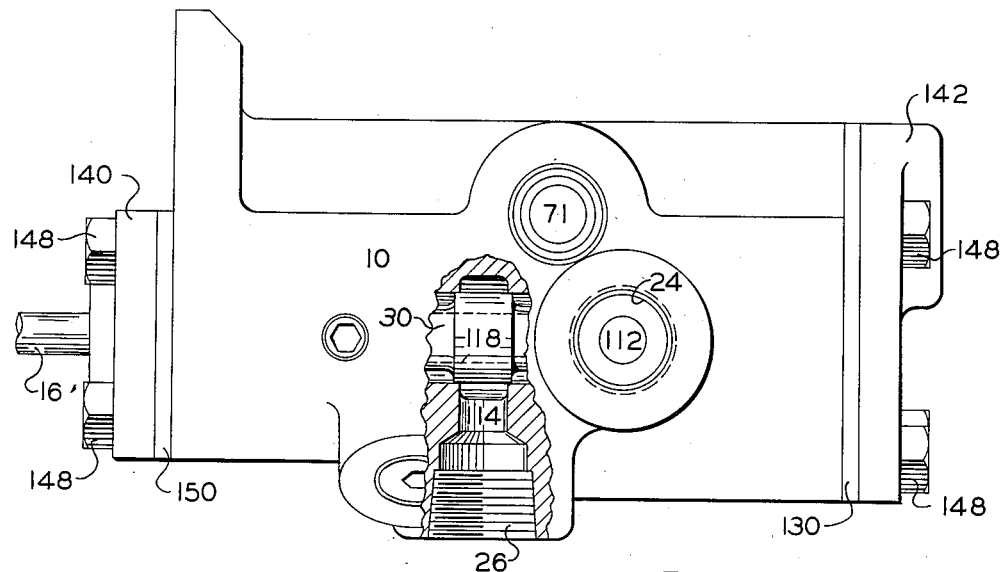
Figure 4 is a top view of the valve shown in Figure 1.
Figure 5:
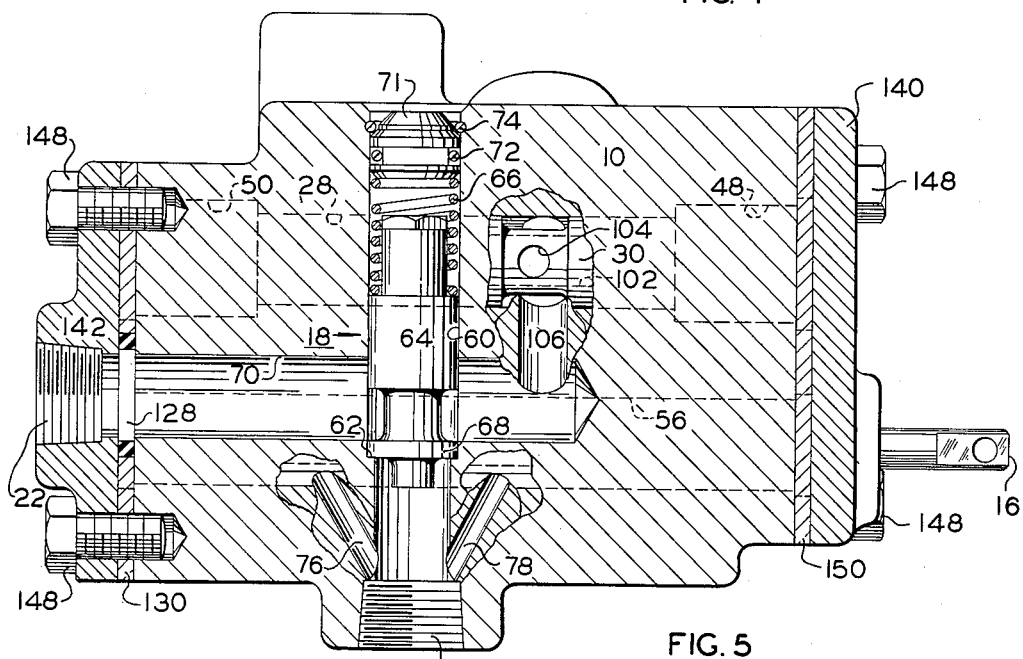
Figure 5 is a cross section on line 5—5 of Figure 2.

Referring now to Figure 1, there is illustrated a valve assembly having a body 10 within which are positioned a main directional valve indicated at 12, a pilot valve 14 having a control stem 16 and a combined unloading and pressure compensating or regulating valve indicated at 18 in Figure 3. The body is provided with a pressure port 20, a tank port 22, and a pair of cylinder ports 24 and 26 (Figure 3). The bore of the directional valve 12 is indicated at 28 and it has a spool 30 slidably positioned therein. The spool is spring-centered by means of opposing springs 32 and 34 having washers 36 and 38 which coact with shoulders 40 and 42 in bore 28 and shoulders 44 and 46 on the spool 30 to maintain the valve spool in central position except when it is shifted by pilot pressure applied to either of the end chambers 48 or 50. The end chambers are connected by passages 52 and 54 to the bore 56 of the pilot valve 14 in which the spool 58 is slidably mounted and attached to the control stem 16.

As shown in Figure 3 the bore 60 of the regulating valve 18 constitutes a continuation of pressure port 20 and has a shoulder 62 against which the spool 64 of the valve normally rests. A relatively light spring 66 constantly urges the spool 64 downwardly against the shoulder 62 so that the land 68 blocks communication between port 20 and a bore 70 which forms a continuation of the tank port 22. A plug 71 having a sealing ring 72 is positioned in the upper end of bore 60 by means of a snap ring 74.

Figure 6:
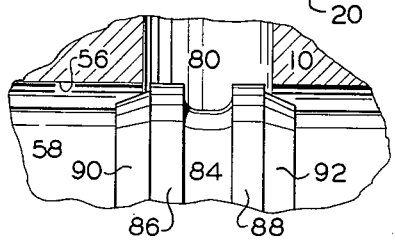
Figure 6 is a fragmentary view of a portion of Figure 1 shown on a larger scale.

Extending between port 20 and spaced points in the bore 56 of the pilot valve are a pair of angular passages 76 and 78. Intersecting bores 56 and 28 is a vertical passage 80 which is plugged at its lower end as shown at 82. Passages 76, 78, and 80 constitute a common, fluid flow path for fluid in which the pilot valve 14 and the directional valve 12 are positioned in series with each other. Flow between the passages 76 and 78 on the one hand and passage 80 on the other hand is controlled by a central land 84 on the spool 58 having cylindrical sealing portions 86 and 88 and reduced diameter tapered portions 90 and 92. The preferred proportions of these parts are shown on a larger scale in Figure 6. The passage 80 beyond the directional valve bore 28 intersects a horizontal passage 94 having a small vertical branch 96 forming a pilot venting port in bore 28 at the left hand end thereof. When in central position a groove 98 on the spool 30 registers with the port 96 and establishes flow through a radial passage 100 and central bore 102 of the spool 30. The central bore communicates with the tank port through radial hole 104 and a passage 106, which constitutes a tank port for directional valve 12, and connects to bore 70 which is the extension of tank port 22. When the spool 30 of the directional valve is shifted either to the right or the left, land 108 or 110 will interrupt this path at port 96.

The cylinder ports 24 and 26 connect with the bore 28 by passages 112 and 114. These passages are normally blocked when the spool 30 is in central position by the lands 116 and 118. When the spool 30 is shifted to the right or to the left these passages are connected alternately, one with the pressure passage 80 and the other with tank passage 106. For establishing the latter connection when the spool 30 is shifted to the left radial holes 120 communicate with the central bore 102 of the spool 30. The bore 102 is plugged at its right hand end.

The pilot valve spool 58 is provided with lands 122 and 124 which control the pilot passages 52 and 54. In central position these lands have a slight lap to seal off pressure passages 76 and 78 from the pilot passages 52 and 54 and also a slight negative lap to connect the latter passages with the tank pressure in the end chambers of the bore 56.

The right hand chamber 126 communicates with the tank port 22 by means of a passage 128 formed in sealing plate 130 (see Figure 2) and the left end chamber 132 communicates with tank port 22 through central bore 134 and inclined passage 136, of the spool 58. A restricted sampling passage 138 connects between the upper end of bore 60 (Figure 3) and the intersection of bore 28 with passage 80.

Figure 2:
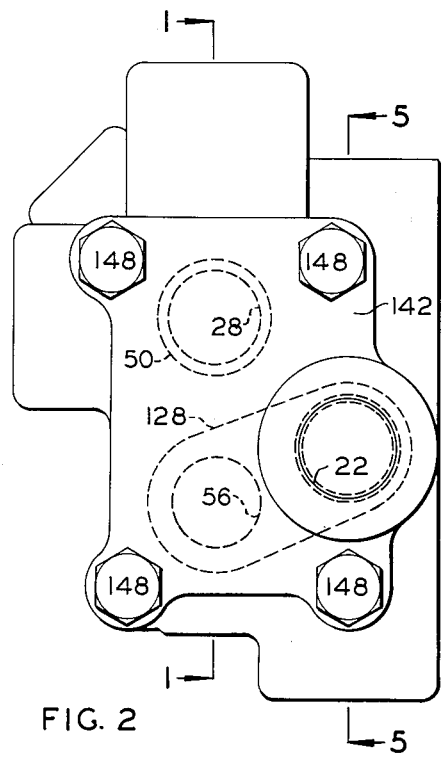
Figure 2 is an end view of the valve assembly illustrated in Figure 1.

The body 10 is provided with end caps 140 and 142, the latter carrying the tank port 22. Cap 140 is provided with a stem opening 144 having a seal 146 therein. The caps are secured to the body by bolts 148 and are sealed thereto by the sealing plate 130 and a similar sealing plate 150. Plate 150 has circular openings therein registering with the bores 28 and 56, respectively, and provided with O rings 152. The plate 130 also has two openings sealed with O rings 152 although the opening 128 is oval in form and spans both the bore 56 and the bore 70 (Figure 2).

The power transmission system diagrammed in Figure 7 includes a reservoir 154 from which a suction line 156 leads to a continuously driven constant displacement pump 158. The delivery passage 160 extends from the pump through a relief valve 162 to the pressure port 20 of valve assembly 10. Tank port 22 is connected to the reservoir 154 by a line 164. A branch 166 affords a discharge conduit for the relief valve 162.

Ports 24 and 26 of the valve 10 are connected by conduits 168 and 170 with a fluid motor 172 which is shown as of the piston and cylinder type. Feed back between the rod 174 of motor 172 and the control stem 16 of valve 10 is provided by a floating lever 176 which is connected by a link 182 to a manually operable handle 178 pivoted at 180.

The operation of the system can best be understood from the diagrams in Figures 7, 8, and 9. In Figure 7 the parts are shown in neutral position wherein the motor 172 is stationary, the directional valve 12 and the pilot valve 14 are centered, and the regulating valve 18 is substantially fully opened. Under these conditions fluid delivered by the pump 158 is freely circulated through the passages 160, 20, 164, and 156. The resistance imposed is only that of the fluid friction in the passages plus a slight back pressure imposed by the action of spring 66 tending to push the spool 64 toward closed position. In a typical system designed for operation at a 1000 p. s. i. maximum pressure the pressure generated by a spring 66 over the end area of spool 64 may be of the order of 20 p. s. i. It will be noted that under the conditions just described, motor 172 is blocked against movement by the action of spools 116 and 118 at the passages 112 and 114. Thus if the piston rod 174 is connected to a load which exerts a continuous force in one direction, that load is held against movement. An example of such a load is a gravity load of the type imposed by a tractor mounted farm plow. This will be held against falling by gravity except at the minutely slow rate permitted by inherent leakage such as that within the motor 172 and that at the sealing lands 116 and 118 of the directional valve 12.

With the valve 12 in central position, venting port 96 is connected to tank through groove 98, passages 100, 102, 104, 106, 70, 22, and 164. The resistance of this path is effectively determined by the size of the radial hole 100. This area is chosen in relation to the passage formed by the lands 86 and 88 and bore 80 so as to be substantially larger than the latter and impose negligible resistance in relation thereto. Thus the pressure in passage 80 under these conditions is maintained at substantially atmospheric. This pressure transmitted through restricted passage 138 permits the spool 64 of regulating valve 18 to open substantially fully as determined by the force of spring 66. Preferably, a small flow is nevertheless maintained from bore 56 past the lands 86 and 88 into passage 80 although if desired these lands may be constructed to completely block such flow.

Operation of the valve structure to produce movement of the motor takes place in two phases. During a very short range of movement either side of position, designated range A in Figure 7, travel of the control stem 16 serves only to initiate loading of the pump and unlocking of the motor when travel is away from center and terminate them when travel is toward center. During the additional range of travel stem 16, designated B, Figure 7, motor movement is maintained and at a speed determined in accordance with the amount of displacement of control stem 16.

The flow conditions which take place when the control stem has been moved to the left hand edge of range A are illustrated in Figure 8. Here it will be seen that the opening between land 88 and port 80 is larger than the combined openings of 86 and 88 to port 80 in Figure 7. This opening is also larger than the opening through radial passage 100 in valve 12. This will cause pressure to build up in passage 80. Since the compensating valve 18 is responsive to the pressure drop across the land 88 and tends to maintain this drop at a constant value, pressure in the central parts of bore 56 will increase at the same rate as the pressure in passage 80. The former, however, will be a predetermined amount higher than the latter.

In the position of the pilot valve spool 58 shown in

Figure 8 lands 122 and 124 have connected passages 52 and 54 with pressure and tank respectively. Thus the pressure in the central part of bore 56 is made effective in the left hand chamber 48 of the directional valve 12. This pressure is opposed by the spring 34 in the right hand chamber which chamber is, of course, connected to the tank. As the pressure builds up in bore 56 and reaches the point where spring 34 can be overcome, the directional valve spool 30 will shift to the right and the completion of this movement has been illustrated in Figure 8. Thereupon, no further flow takes place into the end chamber 48 and the flow going into bore 56 is all directed to the motor through passage 80, port 24, and line 168. Fluid returning from the motor through line 170 and port 26 is directed to tank through passages 106, 70, 22, and 164.

This flow is at a very small rate and is maintained constant by the action of compensating valve 18 independent of load resistance. For this purpose the spool 64 moves toward and away from the seat 62 to vary the pressure at port 20 in a manner to maintain it a constant amount above the pressure in passage 80. Thus when the load resistance is high the spool 64 will move very close to the seat 62 and thus require a high pressure in order for the constant volume of oil from the pump to flow through this valve. The constant volume here referred to is the total volume output of the pump minus the volume passing across the throttle between land 88 and port 80 at the constant pressure differential established by valve 18. When the load resistance is light spool 64 will move away from the seat so that a much lower pressure is required to force this same constant volume of fluid through the valve 18.

When it is desired to move the motor at a faster rate than the minimum the control stem 16 is shifted into the desired position in range B and flow conditions are as illustrated in Figure 9. This is the same as Figure 8 except that the size of the opening between bore 56 and passage 80 is determined by the tapered position 92 on the spool 58. Thus a larger orifice is presented and with a constant pressure drop maintained across this orifice by valve 18 a larger volume of fluid will flow to the load. When the motor has moved to the desired position the follow-up action of the floating lever 176 restores the control stem to neutral position. When it gets within the range A and the pilot valve becomes centered both end chambers 48 and 50 are connected to tank by lands 122 and 124 and the spring 34 will center the directional valve. Thus the conditions illustrated in Figure 7 are restored. Operation for movement of the motor in the opposite direction will be obvious.

It will thus be seen that the present invention provides a combined flow-metering, pump-unloading, motor-blocking, directional valve usable in a constant volume hydraulic power system and controllable by feed-back from the motor.

While the form of embodiment of the invention as herein disclosed constitutes a preferred form, it is to be understood that other forms might be adopted, all coming within the scope of the claims which follow.

What is claimed is as follows:

1. A hydraulic power control system for use with a pump of the constant displacement type comprising in combination a spring-neutralized, pilot-operated, directional valve having pressure and tank ports and at least one motor port, and arranged to block off the motor port in neutral position, a pilot valve connected to control fluid flow to shift the directional valve, a common pressure passage for both valves with the pilot valve connected in series with and ahead of the directional valve, means associated with the pilot valve which, during the first increments of pilot valve movement away from neutral position, control pilot fluid to cause complete shifting of the directional valve, and other means associated with the pilot valve which, during further movement away from neutral position, provide variable throttling of the fluid flowing in the common pressure passage.

2. A hydraulic power control system for use with a pump of the constant displacement type comprising in combination a spring-neutralized, pilot-operated, directional valve having pressure and tank ports and at least one motor port, and arranged to block off the motor port in neutral position, a pilot valve connected to control fluid flow to shift the directional valve, a common pressure passage for both valves with the pilot valve connected in series with and ahead of the directional valve, a compensating valve responsive to the pressure drop through the pilot valve for regulating the flow rate through the common pressure passage, means associated with the pilot valve which, during the first increments of pilot valve movement away from neutral position, control pilot fluid to cause complete shifting of the directional valve, and other means associated with the pilot valve which, during further movement away from neutral position, provide a flow rate in the common pressure passage which varies in accordance with the position of the pilot valve.

3. A hydraulic power control system for use with a pump of the constant displacement type comprising in combination a spring-neutralized, pilot-operated, directional valve having pressure and tank ports and at least one motor port, and arranged to block off the motor port in neutral position, a pilot valve connected to control fluid flow to shift the directional valve, a common pressure passage for both valves with the pilot valve connected in series with and ahead of the directional valve, a third valve controlling a bypass from the pressure passage to the tank port, and means on the directional valve for controlling the third valve to permit opening thereof when the directional valve is in neutral position.

4. A hydraulic power control system for use with a pump of the constant displacement type comprising in combination a spring-neutralized, pilot-operated, directional valve having pressure and tank ports and at least one motor port, and arranged to block off the motor port in neutral position, a pilot valve connected to control fluid flow to shift the directional valve, a common pressure passage for both valves with the pilot valve connected in series with and ahead of the directional valve, a third valve controlling a bypass from the pressure passage to tank, and means on the directional valve for controlling the third valve to permit opening thereof when the directional valve is in neutral position, the last means including a port opened from the pressure passage to the tank port and having a larger area than an area open through the pilot valve in the pressure passage when the pilot valve is in neutral position.

5. A valve assembly for use with a pump of the constant displacement type for controlling the direction and rate of fluid flow from the pump to a fluid motor and for positively blocking the motor and unloading the pump in neutral comprising in combination a main directional valve of the pilot-operated, spring-neutralized type and having means for blocking the motor in neutral position, a pilot valve connected to control shifting of the directional valve and having a pressure supply passage leading to the directional valve and subject to throttling in accordance with the position of the pilot valve, said throttling action approaching cut-off at neutral position of the pilot valve, means forming a bypass from the pressure passage at a point ahead of the pilot valve to tank, and means rendered effective by motion of the directional valve to neutral position for opening said bypass to unload the pump.

6. A valve assembly for use with a pump of the constant displacement type for controlling the direction and rate of fluid flow from the pump to a fluid motor and for positively blocking the motor and unloading the pump in neutral comprising in combination a main directional valve of the pilot-operated, spring-neutralized type and having means for blocking the motor in neutral position, a pilot valve connected to control shifting of the directional valve and having a pressure supply passage leading to the directional valve and subject to throttling in accordance with the position of the pilot valve, said throttling action approaching cut-off at neutral position of the pilot valve, and a compensating valve connected to respond to the pressure drop induced by said throttling action for regulating the flow rate to the directional valve independently of load resistance.

7. A valve assembly for use with a pump of the constant displacement type for controlling the direction and rate of fluid flow from the pump to a fluid motor and for positively blocking the motor and unloading the pump in neutral comprising in combination a main directional valve of the pilot-operated, spring-neutralized type and having means for blocking the motor in neutral position, a pilot valve connected to control shifting of the directional valve and having a pressure supply passage leading to the directional valve and subject to throttling in accordance with the position of the pilot valve, said throttling action approaching cut-off at neutral position of the pilot valve, a compensating valve connected to respond to the pressure drop induced by said throttling action for regulating the flow rate to the directional valve independently of load resistance, and means operated by the directional valve when neutralized for causing the compensating valve to unload the pump.

8. A hydraulic power control system for use with a pump of the constant displacement type comprising, a pilot-operated directional valve for controlling a fluid motor, means forming a pressure passage communicating with said directional valve, pilot valve means shiftable to operate said directional valve, means in said pressure passage forming a restriction to flow to said directional valve, a compensating valve subjected to the pressure drop across said restriction to regulate flow in said pressure passage, and means for varying said restriction conjointly with shifting of said pilot valve.

9. A hydraulic power control system for use with a pump of the constant displacement type comprising, a pilot-operated directional valve for controlling a fluid motor, means forming a pressure passage communicating with said directional valve, pilot valve means shiftable to operate said directional valve, means on said pilot valve forming a restriction to flow in said pressure passage to said directional valve, whereby said restriction will be varied conjointly with shifting of said pilot valve, and a compensating valve subjected to the pressure drop across said restriction to regulate flow in said pressure passage.

10. A hydraulic power control system for use with a pump of the constant displacement type comprising, a pilot-operated directional valve for controlling a fluid motor, means forming a pressure passage communicating with said directional valve, pilot valve means shiftable to operate said directional valve, means in said pressure passage forming a restriction to flow therein, a compensating valve subjected to the pressure drop across said restriction to regulate flow in said pressure passage, means forming a vent passage communicating with said pressure passage downstream of said restriction, means for blocking said vent passage on movement of said directional valve, and means for varying said restriction conjointly with shifting of said pilot valve, whereby the function of said compensating valve will alternatively be flow controlling and pump unloading.

11. A hydraulic power control system for use with a pump of the constant displacement type comprising, a pilot-operated directional valve for controlling a fluid motor, means forming a pressure passage communicating with said directional valve, pilot valve means shiftable to operate said directional valve, means in said pressure passage forming a restriction to flow therein, a compensating valve subjected to the pressure drop across said restriction to regulate flow in said pressure passage, means forming a vent passage communicating with said pressure passage downstream of said restriction, said vent passage including a valve port, means on said directional valve for controlling flow through said valve port, and means for varying said restriction conjointly with shifting of said pilot valve, whereby the function of said compensating valve will alternatively be flow controlling and pump unloading.

12. A hydraulic power control system for use with a pump of the constant displacement type comprising, means forming a pressure passage extending from said pump, means in said pressure passage forming a restriction to flow therein, a compensating valve subjected to the pressure drop across said restriction to regulate flow in said pressure passage, means forming a vent passage communicating with said pressure passage downstream of said restriction, fluid pressure actuable vent passage blocking means, and conjointly operable means for varying said restriction and actuating said vent passage blocking means whereby the function of said compensating valve will alternatively be flow controlling and pump unloading.

13. A hydraulic power control system for use with a pump of the constant displacement type comprising, means forming a pressure passage extending from said pump, means in said pressure passage forming a restriction to flow therein, a compensating valve subjected to the pressure drop across said restriction to regulate flow in said pressure passage, means forming a vent passage communicating with said pressure passage downstream of said restriction, fluid pressure actuable vent passage blocking means, and a pilot valve for actuating said blocking means, said pilot valve having integral therewith means for varying said restriction, whereby the function of said compensating valve will alternatively be flow controlling and pump unloading.

14. A hydraulic power control system for use with a pump of the constant displacement type comprising, means forming a pressure passage extending from said pump, means in said pressure passage forming a restriction to flow therein, means in said pressure passage downstream of said restriction to block return flow therein, a compensating valve subjected to the pressure drop across said restriction to regulate flow in said pressure passage, means forming a vent passage communicating with said pressure passage between said restriction and said means to block return flow, fluid pressure actuable vent passage blocking means, and conjointly operable means for varying said restriction and actuating said vent passage blocking means whereby the function of said compensating valve will alternatively be flow controlling and pump unloading.

References Cited in the file of this patent
UNITED STATES PATENTS

| | | |
|---|---|---|
| 2,157,707 | Keel | May 9, 1939 |
| 2,498,543 | Gardiner | Feb. 21, 1950 |
| 2,649,107 | Avery | Aug. 18, 1953 |